United States Patent [19]
DeSanto

[11] Patent Number: 6,126,820
[45] Date of Patent: Oct. 3, 2000

[54] APPARATUS FOR PURIFYING LIQUIDS

[75] Inventor: Mark R. DeSanto, Mokena, Ill.

[73] Assignee: LiquiTech, Inc., Willowbrook, Ill.

[21] Appl. No.: 09/198,963

[22] Filed: Nov. 24, 1998

[51] Int. Cl.$^7$ .................................................. C02F 1/467
[52] U.S. Cl. ........................ 210/143; 204/228.1; 204/248; 210/192; 210/198.1; 210/232; 210/243
[58] Field of Search .................... 204/228.1, 229.2, 204/248, 275; 205/743, 744, 745; 210/748, 192, 232, 243, 143, 198.1, 205

[56] References Cited

U.S. PATENT DOCUMENTS

| | | | |
|---|---|---|---|
| 4,013,557 | 3/1977 | Snodgrass et al. | 210/138 |
| 4,016,748 | 4/1977 | Boyens | 138/97 |
| 4,127,467 | 11/1978 | Smith | 204/275 |
| 4,434,357 | 2/1984 | Simpson et al. | 219/291 |
| 5,114,571 | 5/1992 | Pier et al. | 210/96.1 |
| 5,364,512 | 11/1994 | Earl | 204/228 |
| 5,543,040 | 8/1996 | Fite et al. | 210/167 |
| 5,744,028 | 4/1998 | Goto et al. | 210/138 |
| 5,833,842 | 11/1998 | Fields | 210/85 |

*Primary Examiner*—Peter A. Hruskoci
*Attorney, Agent, or Firm*—Banner & Witcoff

[57] ABSTRACT

A liquid purification system comprises a flow cell housing electrodes capable of introducing ions into a liquid passing through the flow cell when a current supplied by a controller is applied across the electrodes. The controller is capable of supplying current between zero and ten amps, and at zero to one hundred volts direct current (DC) across the electrodes. The liquid purification system is easily plumbed into the pipework carrying the liquid to be purified. A by pass line is typically installed around the liquid purification system for easing of operation and maintenance. An upstream and downstream adapters are installed on the pipe and separated by a distance approximating the length of the flow cell. The flow cell is positioned between the two adapters and quick connect clamps are used to maintain a seal between the adapters and the flow cell. Removal of the flow cell can occur by stopping the liquid flow on the upstream end of the pipe or opening the by pass line around the flow cell. The quick connect clamps can be removed and the flow cell repositioned for access to the electrodes.

22 Claims, 3 Drawing Sheets

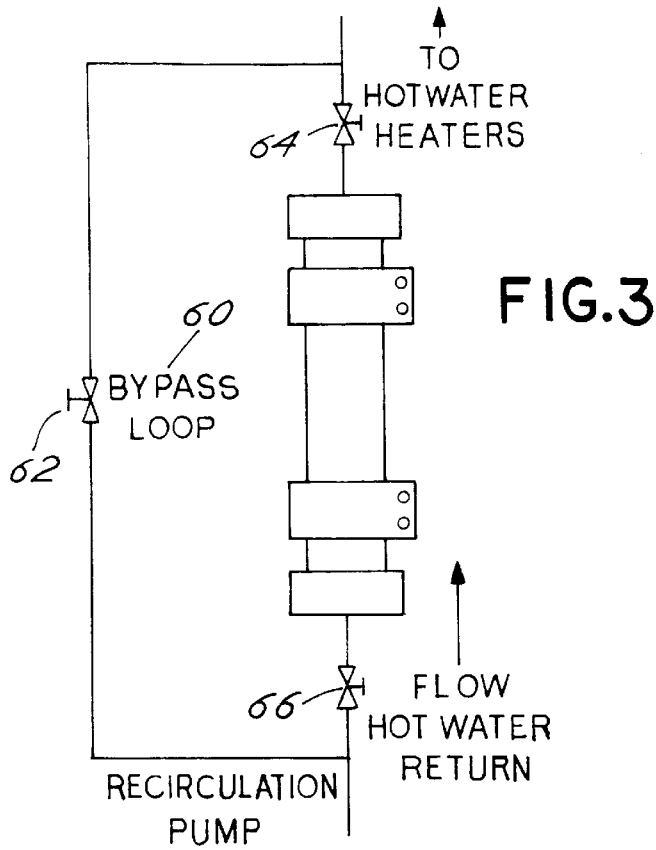
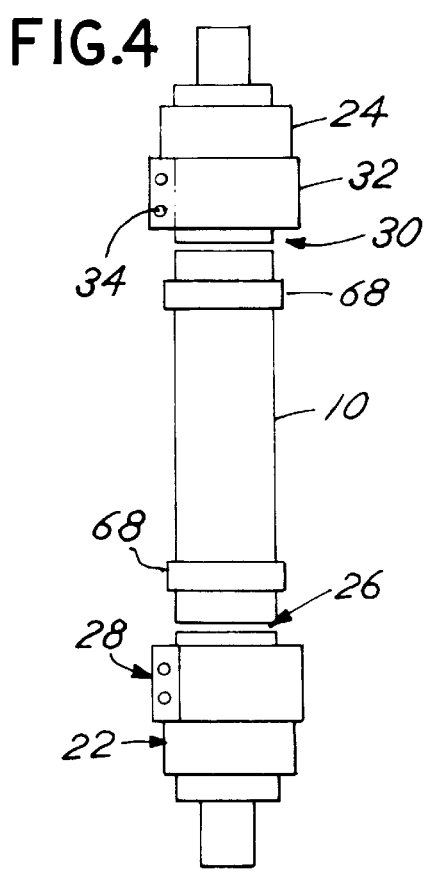
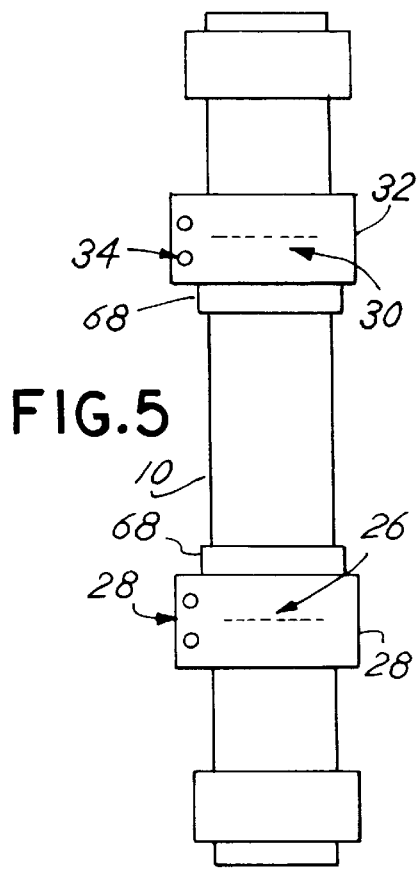

APPARATUS FOR PURIFYING LIQUIDS

FIELD OF THE INVENTION

This invention relates to a liquid purification device which electronically introduces copper and/or silver ions into liquids to be purified. The invention is well suited for on demand domestic water systems, recreational water facilities, animal habitats, food processing and various industrial applications.

BACKGROUND

The eradication or controlling of microorganisms in liquids is typically accomplished by conventional heavy chemical dosing or other lesser-used methods of control. It has long been established that certain metal ions have purifying ability when present in many liquids and the efficacy of copper and silver ions for purification is well documented. The emissions of an ionization process are cationic, surface-active and provide a potent biocide. These ions eradicate or minimize various microorganisms in liquids, including but not necessarily limited to: Legionella, *E. coli*, Salmonella, *M. avium, listeria*, Staphylococcus and *Pseudomonas aeriginosa*.

The disinfection action is attributable to the positively charged copper and silver ions which form electrostatic bonds with negatively charged sites on microorganism cell walls. These electrostatic bonds create stresses which lead to distorted cell wall permeability, reducing the normal intake of life-sustaining nutrients. This action, coupled with protein denaturation, leads to cell lysis and death. Bacteria are killed rather than merely suppressed as in the case with alternative control methods.

Electronic ionization process is an effective method of controlling microorganisms in many liquids. However, a need exists for a system for automating the ionization process while maintaining a constant current across electrodes immersed in the liquid being ionized. A recurring problem is maintaining a constant current across the electrodes. In the past, this has been accomplished by manually adjusting the current. Unfortunately, the manual adjustment of current is affected by other factors such as electrode wear, build up of scale on the electrodes, and the properties of the liquid being purified. Automating a system so that a constant current can be maintained is desired to achieve an efficient system, reduce operator workloads and the potential for errors. Maintaining a constant current will produce precise ion levels providing for residual protection and prevention of recontamination.

SUMMARY

A liquid purification system comprises a flow cell housing electrodes capable of introducing ions into a liquid passing through the flow cell when a current supplied by a controller is applied across the electrodes. The controller is capable of supplying current between zero and ten amps, and at zero to one hundred volts direct current (DC) across the electrodes. The liquid purification system is easily plumbed into the pipework carrying the liquid to be purified. A by pass line is typically installed around the liquid purification system for easing of operation and maintenance. Upstream and downstream adapters are installed on the pipe and separated by a distance approximating the length of the flow cell. The flow cell is positioned between the two adapters and quick connect clamps are used to maintain a seal between the adapters and the flow cell. Removal of the flow cell can occur by stopping the liquid flow on the upstream end of the pipe or opening the by pass line around the flow cell. The quick connect clamps can be removed and the flow cell repositioned for access to the electrodes.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

FIG. 3 illustrates the flow cell in a typical water system.

FIG. 4 illustrates the installation of the flow cell using the quick connect clamp.

FIG. 5 illustrates the installation of the flow cell using the quick connect clamp.

DETAILED DESCRIPTION OF PREFERRED EMBODIMENTS

Incorporated by reference is "Method and Apparatus for Controlling the Purification of Liquids" filed on Nov. 24, 1998 and identified by Ser. No. 09/198,657, and "Method and Apparatus for Electronic Circuitry Used in a System for Purifying Liquids" filed on Nov. 24, 1998 and identified by Ser. No. 09/198,996.

Figure 1:
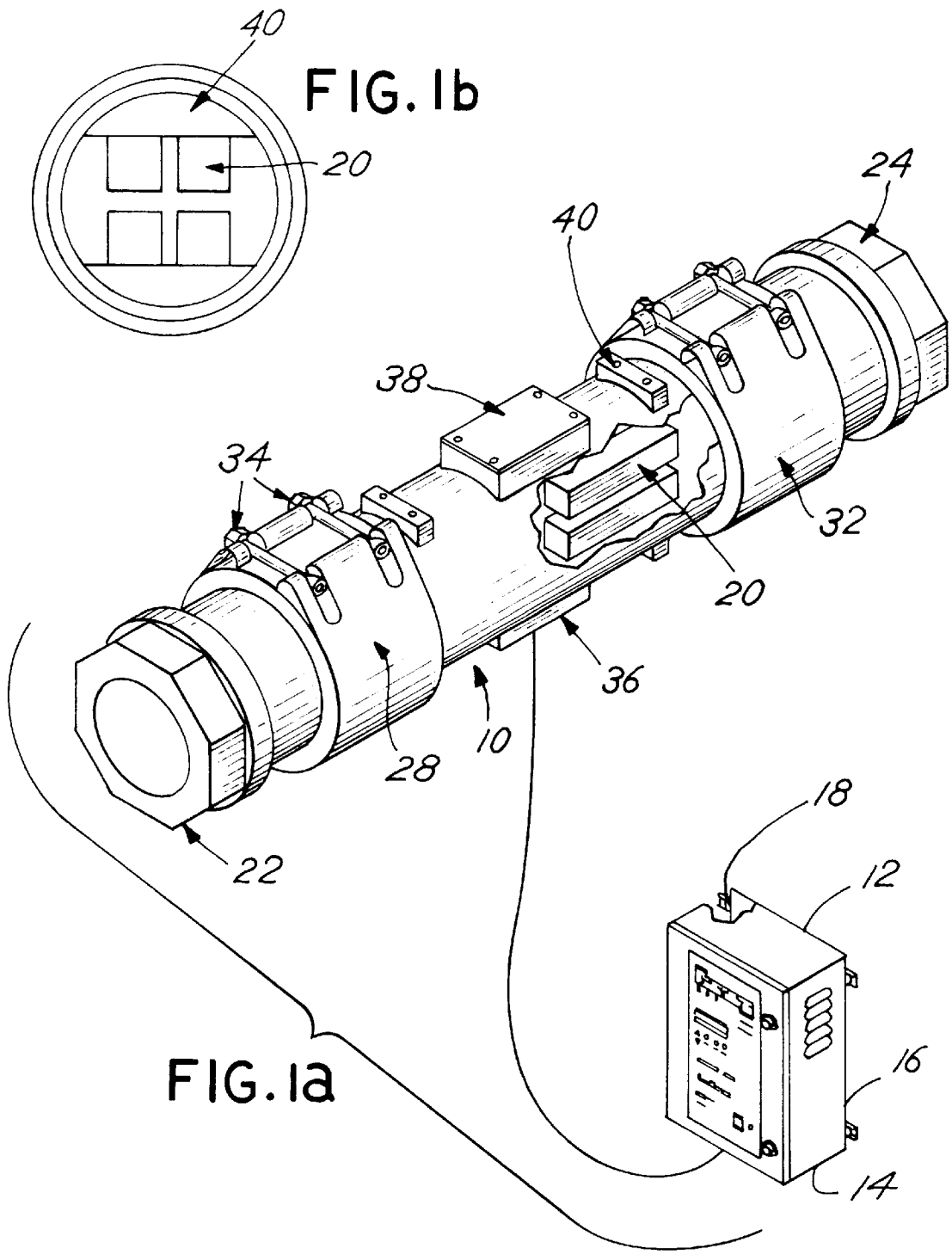
FIG. 1*a* illustrates a perspective view of the flow cell attached with a quick connect clamp.
FIG. 1*b* illustrates a cross sectional diagram of the flow cell.

The liquid purification system comprises two major components: the flow cell and the controller. FIG. 1 a illustrates a perspective view of the flow cell 10 connected to its control panel 12. Housed within the control panel 12 are a power module 14 and a control module 16. The power module 14 converts power line 18, alternating current (AC) current into direct current (DC).

The power module 14 is capable of producing 0 to 10 amps at 0 to 100 volts direct current (DC). This output potential provides flexibility in the liquid purification system by its ability to provide output current for a wide range of liquid conductivity without being limited for lack of voltage. As an example, average conditions involve purifying a liquid with a conductivity of 300 micromhos, creating a resistance at the flow cell 10 of approximately 10 ohms, requiring 50 volts to produce a 5 amp output. With the purification system's 100 volt potential, it is able to produce the same 5 amp output with a lower conductivity liquid, increasing the range of resistance at the flow cell to 20 ohms. Conversely, at the average resistance (conductivity) of 10 ohms, the system can produce a full 10 amps output at 100 volts DC. The only alternative for dealing with lower conductivity liquids would be to add additional flow cells 10, increasing the number of electrodes 20 in parallel, lowering the resistance at the output. This alternative is not only maintenance intensive, but it increases cost and installation problems.

Applying 0 to 100 volts potential to the electrodes 20 is very difficult to control using low voltage (4–20 mA) control signals. The 100 volts can be manually stepped up or down, but the process for creating gradual increases and decreases with an automated control system by using a very low amperage control signal is problematic. The electronic circuitry housed within the power and control modules 14 and 16 respectively, overcome the stepping problems normally associated with controlling a 0–10 amp, 0 to 100 volt power supply.

The flow cell 10 has a first female adaptor 22 located on the upstream end of the flow cell 10 and a second female adaptor 24 located on the downstream end of the flow cell 10. The first female adapter 22 butts against the upstream edge 26 of the flow cell 10 as shown in FIGS. 1a and 4. The upstream quick connect clamp 28 secures the first female adapter 22 to the flow cell 10. Similarly, the second female adapter 24 butts against the downstream edge 30 of the flow cell 10. The downstream quick connect clamp 32 secures the second female adapter 24 to the flow cell 10. Bolts 34 provide a mechanism for tightening and loosening of the upstream and downstream quick connect clamps 28 and 32. The first and second female adapters 22 and 24 are preferably threaded adapters, but could also be slip fitted.

Wiring box 36 holds the electrical line connections so that the electrodes 20 can be connected to the control panel 12. Wiring box 38 holds additional wiring for connecting the electrodes 20 such that first set of electrodes 20 can be connected to a second set of electrodes (not shown). The electrodes 20 are held into position by spacers 40 that provide a flat surface for the electrodes to be mounted within the circular interior space of the flow cell.

The electrode spacers 20 are preferably manufactured using polybutylene terephthalate (PBT) polyester resin. Although the cross section of the flow cell is typically circular, other embodiments could utilize a variety of cross sectional shapes and the spacers 20 act to position and insulate the electrodes 20 from the flow cell 10.

Typically, the electrodes 20 comprise silver, copper or an alloy mixture of silver and copper. Typical mixture ratios vary between 50% and 100% copper depending upon the chemical composition of the liquid to be purified and the operating conditions of the purification system. The electrodes 20 are mounted in pairs such that when a current is applied to the electrode pair, a voltage potential is created between the two electrodes allowing for silver and/or copper ions to enter the liquid passing within the flow cell.

Figure 2:
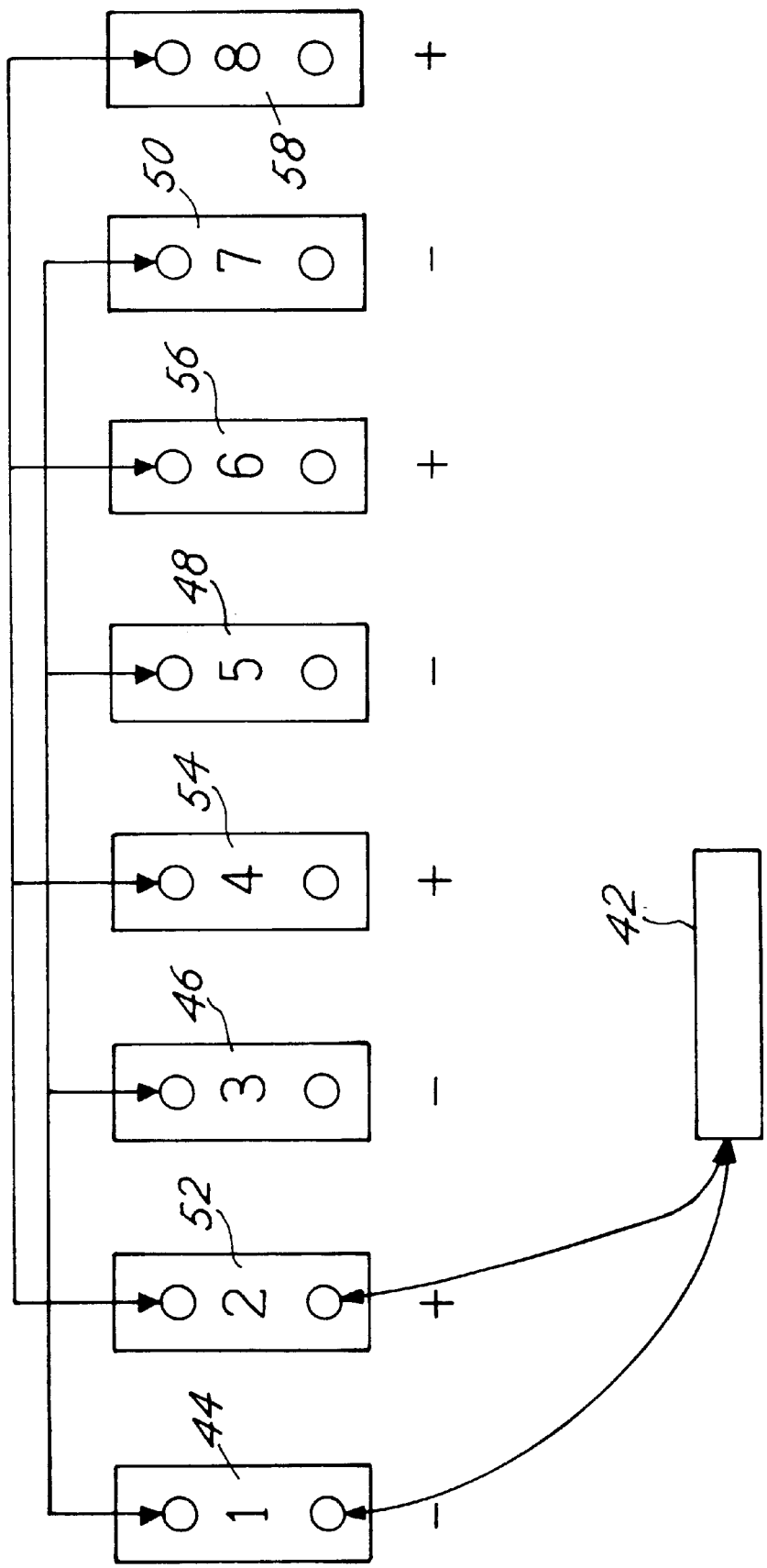
FIG. 2 illustrates of the electrical connection layout of the electrodes.

FIG. 2 illustrates the electrical connections of the electrodes 20 as mounted in a flow cell 10 containing 4 pairs. The electrodes are preferably arranged in two sets of four electrodes as illustrated in FIG. 1b. (The second set of electrodes are located upstream of the set shown in FIG. 1a and 1b). Within wiring box 36, junction 42 connects the first electrode 44 to the electrical circuit supplying the DC power. In parallel, the first electrode 44 is connected to the third, fifth and seventh electrodes 46, 48, and 50, respectively. Conversely, junction 42 also connects to the second electrode 52. The second electrode 52 is also connected in parallel to the fourth, sixth and eighth electrodes 54, 56, and 58, respectively. Depending upon the power sent from the power module, the current will have either a positive or negative polarity. This polarity will change as specified by the programmed control scheme set in the control panel 12.

The electrodes 20 are mounted within the flow cell 10 such that the electrodes 20 and the electrode spacers 40 impede and interrupt the liquid's flow path creating a zone of severe turbulence. The turbulence provides a cleaning process that minimizes scale buildup on the electrodes 20, enhances the ionization process and allows fewer adjustments to voltage to maintain a constant power output.

FIG. 3 illustrates a location of the flow cell in a typical water system. The flow cell 10 is typically installed in the recirculation loop of a domestic or commercial water distribution system. A preferred location is upstream of the hot water source installed either vertically or horizontally. A bypass loop 60 is typically installed to permit servicing of the flow cell 10 without interrupting the system of water in the system. Shut off valves 62 is opened and shut off valves 64 and 66 are closed prior to removal of the flow cell 10. Once removed, the flow cell 10 can be repaired or cleaned and returned to service with minimal interruption of service to the water system.

FIG. 4 illustrates the installation of the flow cell using the quick connect clamp. The flow cell 10 is positioned between the upstream female adapter 22 and the downstream female adapter 24. The upstream quick connect clamp 28 is placed on the upstream female adapter 22 and the downstream quick connect clamp 32 is placed on the downstream female adapter 24. The flow cell 10 is positioned between the upstream female adapter 22 and the downstream female adapter 24. The upstream quick connect clamp 28 and the downstream quick connect clamp 32 are slid into position such that the upstream and downstream quick connect clamps 28 and 32 abut the clamp stoppers 68. The bolts 34 are tightened causing the quick connect clamps 28 and 32 to maintain a seal between the flow cell 10 and the upstream 22 and downstream 24 adapters.

FIG. 5 illustrates the installation of the flow cell using the quick connect clamp where the quick connect clamps 28 and 32 abut against the clamp stoppers 68. Once slid into position, bolts 34 are tightened providing a compression seal preventing liquid leaks from the connection of the flow cell 10 in the liquid supply line (not shown).

Removal of the flow cell involves the reverse procedure. The liquid flowing through the flow cell 10 is shut off. An alternative embodiment includes the location of valves 64 and 66 and the closing off of these valves. Valve 62 located in a by pass loop or pipe 60 is opened allowing for the continued flow of liquid. The bolts 34 are loosened and the quick connect clamps 28 and 32 are slid onto the upstream 22 and downstream 24 adapters. The flow cell 10 can then be removed from the line and serviced.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

What is claimed is:

1. A liquid purification apparatus comprising:

a flow cell housing at least two electrodes and having a liquid enter and exit the flow cell, the flow cell having first and second clamp stoppers;

a controller supplying current to the electrodes such that ions are released from the electrodes in the liquid;

an upstream adapter mounted to an upstream pipe carrying liquid entering the flow cell;

an upstream quick connect clamp securing the flow cell to the upstream adapter, the upstream quick connect clamp being slidable over the flow cell to abut the first stopper and capable of maintaining a seal between the flow cell and said upstream adapter;

a downstream adapter mounted to a downstream pipe carrying liquid exiting the flow cell; and a downstream quick connect clamp securing the flow cell to the downstream adapter, the upstream quick connect clamp being slidable over the flow cell to abut the second stopper and capable of maintaining a seal between the flow cell and said downstream adapter.

2. The liquid purification apparatus, according to claim 1, where the controller supplies between zero and ten amps of current to the electrodes.

3. The liquid purification apparatus, according to claim 1, where the controller supplies between zero and one hundred volts to the electrodes.

4. The liquid purification apparatus, according to claim 1, where the electrodes comprise copper.

5. The liquid purification apparatus, according to claim 1, where the electrodes comprise silver.

6. The liquid purification apparatus, according to claim 1, where the electrodes comprise an alloy of copper and silver.

7. The liquid purification apparatus according to claim 1, further comprising spacers separating and positioning the electrodes within the flow cell.

8. The liquid purification apparatus according to claim 7, where the spacers comprise polybutylene terephthalate (PBT) polyester resin.

9. The liquid purification apparatus according to claim 7, further comprising a bypass line connecting the upstream pipe and the downstream pipe.

10. The liquid purification apparatus according to claim 7, further comprising an upstream valve in the upstream pipe and a downstream valve in the downstream pipe for isolating the flow cell.

11. The liquid purification apparatus, according to claim 1, wherein the upstream and downstream quick connect clamps each include at least one bolt to cause the quick connect clamps to maintain the seal between the flow cell and the upstream and downstream quick connect clamps.

12. A liquid purification apparatus comprising:
a flow cell housing at least two electrodes and having a liquid enter and exit the flow cell, the flow cell having first and second clamp stoppers;
an upstream adapter mounted to an upstream pipe carrying liquid entering the flow cell;
an upstream quick connect clamp securing the flow cell to the upstream adapter, the upstream quick connect clamp being slidable over the flow cell to abut the first stopper and capable of maintaining a seal between the flow cell and said upstream adapter;
a downstream adapter mounted to a downstream pipe carrying liquid exiting the flow cell; and
a downstream quick connect clamp securing the flow cell to the downstream adapter, the upstream quick connect clamp being slidable over the flow cell to abut the second stopper and capable of maintaining a seal between the flow cell and said downstream adapter.

13. The liquid purification apparatus, according to claim 12, wherein the upstream and downstream quick connect clamps each include at least one bolt to cause the quick connect clamps to maintain a seal between the flow cell and the upstream and downstream quick connect clamps.

14. The liquid purification apparatus, according to claim 12, further comprising a controller supplying between zero and ten amps of current to the electrodes.

15. The liquid purification apparatus, according to claim 12, further comprising a controller supplying between zero and one hundred volts to the electrodes.

16. The liquid purification apparatus, according to claim 12, where the electrodes comprise copper.

17. The liquid purification apparatus, according to claim 12, where the electrodes comprise silver.

18. The liquid purification apparatus, according to claim 12, where the electrodes comprise an alloy of copper and silver.

19. The liquid purification apparatus according to claim 12, further comprising spacers separating and positioning the electrodes within the flow cell.

20. The liquid purification apparatus according to claim 19, where the spacers comprise polybutylene terephthalate (PBT) polyester resin.

21. The liquid purification apparatus according to claim 12, further comprising a bypass line connecting the upstream pipe and the downstream pipe.

22. The liquid purification apparatus according to claim 12, further comprising an upstream valve in the upstream pipe and a downstream valve in the downstream pipe for isolating the flow cell.

* * * * *